United States Patent [19]

Priaroggia

[11] Patent Number: 4,813,754
[45] Date of Patent: Mar. 21, 1989

[54] OPTICAL FIBER CABLE JOINT

[75] Inventor: Paolo G. Priaroggia, Milan, Italy

[73] Assignee: Societa' Cavi Pirelli S.p.A., Milan, Italy

[21] Appl. No.: 162,621

[22] Filed: Mar. 1, 1988

[30] Foreign Application Priority Data

Mar. 2, 1987 [IT] Italy ............................ 19543 A/87

[51] Int. Cl.[4] .............................................. G02B 6/44
[52] U.S. Cl. ................................................. 350/96.23
[58] Field of Search ............... 350/96.20, 96.21, 96.22, 350/96.23

[56] References Cited

U.S. PATENT DOCUMENTS

| | | | |
|---|---|---|---|
| 4,427,262 | 1/1984 | Oldham | 350/96.23 |
| 4,595,256 | 6/1986 | Guazzo | 350/96.21 |
| 4,697,873 | 10/1987 | Bouvard et al. | 350/96.23 |
| 4,717,232 | 1/1988 | Priaroggia | 350/96.20 |
| 4,722,590 | 2/1988 | Thomas | 350/96.23 |
| 4,746,187 | 5/1988 | Flores | 350/96.20 |

Primary Examiner—William L. Sikes
Assistant Examiner—Frank González
Attorney, Agent, or Firm—Brooks Haidt Haffner & Delahunty

[57] ABSTRACT

A joint between two different types of optical fiber cables, the tension and compression stresses to which the cables are subjected being withstood in one of the cables by a centrally disposed armor having the optical fibers therearound and in the other of the cables by an armor surrounding the optical fibers. The joint includes a plate with a central opening, a plurality of spaced second openings around and spaced from the central opening and a plurality of spaced third openings around and spaced from the second openings, the central armor being secured in the central opening, the armor of the other cable being secured in the third openings and the optical fibers of one of the cables extending through the second openings and being connected to the optical fibers of the other cable. A protective body extends from one cable to the other and encloses the plate, the securing devices, the connections and the portions of the armors and the fibers intermediate the cables.

8 Claims, 3 Drawing Sheets

OPTICAL FIBER CABLE JOINT

The present invention relates to joints for interconnecting two telecommunication cables comprising optical fibers which have mechanically resistant armors of different types.

In particular, the invention relates to a joint to connect together a submarine telecommunication cable comprising optical fibers and in which the resistant armor is entirely at the radially innermost portion of the cable and is, therefore, radially inward of the cable portion containing the optical fibers, and a submarine telecommunication cable comprising optical fibers in which the mechanically resistant armor surrounds the cable portion containing the optical fibers.

A joint in accordance with the invention is also able to carry out the connection of a submarine cable comprising optical fibers of the first type, in which the fibers are disposed around the mechanically resistant armor, with the ends of optoelectronic repeaters formed by portions of cables comprising optical fibers of the second type, in which a mechanically resistant armor surrounds said optical fibers.

Furthermore, it is possible to connect cables of the second type with the ends of optoelectronic repeaters formed by portions of cables of the first type.

The conventional joints used for the connection of submarine telecommunication cables comprising optical fibers can be divided into two groups.

A first group of conventional joints is intended to connect together cables in which the mechanically resistant armor is situated at the cable radially innermost portion.

The joints belonging to said first group, one of which is described, for instance, in the U.S. Pat. No. 4,699,454 of the same Applicant, comprise, from the inside toward the outside, a metallic clamp or the like which connects end-to-end the mechanically resistant armors of the cables whose ends, in the joint area, are perfectly aligned with one another.

Around the metal clamp and to the end portion of the cable armors present in the joint, there is a sleeve of plastic material, the ends of which are secured to the ends of the cable cores containing the optical fibers, which is provided with a plurality of through cavities with axes parallel to the joint axis. The through cavities of the sleeve encase in a loose way the end portions of the optical fibers of the cable and their connections.

A sheath of plastic material or metallic material is arranged around the sleeve, and the ends of said sheath are tightly connected to the cable sheaths.

When any space within the cable sheath not containing other material is filled with a substantially incompressible fluid to impart to the cables a resistance to the hydrostatic pressure, the sheath is not required to provide such resistance. Also, any space free from other material within the joint sheath is filled with a substantially incompressible fluid. In this case, the cable sheath is not required by itself any resistance to the compression due to the hydrostatic pressure, since said resistance is ensured by the complete filling of any space of the joint with the substantially incompressible fluid.

The conventional joints belonging to the first group, as briefly described hereinbefore, offer a high reliability since the connection between the optical fibers, being not hindered by the presence of an armor, can always be carried out in an accurate and correct manner.

However, an essential condition for the employment of the joints belonging to said first group is that the armors of the two cables being joined be aligned with each other and be radially inward of the portion occupied by the optical fibers.

Consequently, it is not possible to effect, by the conventional joints of the first group, the connection between a cable in which the armor is radially inward of the portion occupied by the optical fibers and a cable in which the armor is radially outward with respect to said portion, and this is because, in said two different types of cables, the arrangement between the armor and the optical fibers is contrary to the above indicated essential condition concerning the use of joints belonging to the first group. A second group of conventional joints comprises those intended to connect together cables in which the mechanically resistant armor is radially outward with respect to the portion containing the optical fibers and in which the resistance to the hydrostatic pressure is achieved by means of said mechanically resistant armor. The structure of the joints belonging to this second group, one of which is that described, for example, in the European Patent Application No. 67673, comprises a metal frame, resistant to tension and compression stresses, which incorporates a sealing casing for the joint, resistant by itself to the hydrostatic pressure.

The end of said metal frame carries, anchored to it by connection means aligned with one another, the components of the armors of the two cables, which are also aligned.

Furthermore, at the ends of said metal frame there are openings, surrounded by the above indicated means connecting the armors, in which are housed the cable cores containing the optical fibers. The frame which, as said above, constitutes the sealing casing of the joint and contains the end portions of the optical fibers and their connections.

A drawback shown by the joints of the second type is the difficulty encountered to carry out the necessary steps for the connection of the optical fibers, due to the presence of a frame of complicated structure which negatively affects their reliability.

Moreover, the joints for submarine cables belonging to the second group are intended only to connect together cables having their mechanically resistant armors in alignment and in the radially outward position with respect to the portion thereof containing the optical fibers.

In fact, an essential condition for the employment of the joints belonging to the second group is that the means which connect the components of the armors of the two cables to the joint body, besides being aligned to one another, are radially outward with respect to the openings for the entrance of the cable cores containing the optical fibers.

Consequently, also by the joints of the second type, it is not possible to connect a cable, where the mechanically resistant armor is radially inward with respect to the portion containing the optical fibers, with a cable where said mechanically resistant armor is radially outward of the portion containing the optical fibers. This is due to the fact that the two different types of cables being joined show a relative arrangement between the armor and the optical fibers which is contrary to the above indicated essential condition regarding the use of joints of the second group.

The present invention aims at providing a joint intended to connect two cables even of different diametrical dimensions in one of which the mechanically resistant armors is radially inward with respect to the portion containing the optical fibers while in the other, said mechanically resistant armor is radially outward of the portion containing the optical fibers and which provides an easy system of connection between the optical fibers and proves to be quite reliable.

Accordingly, the subject matter of the present application is a joint for telecommunication cables comprising optical fibers, for connecting a first cable of the type in which the mechanically resistant armor is radially inward of the portion containing the optical fibers with a second cable of the type in which the mechanically resistant armor is radially outward of the portion containing the optical fibers, said joint comprising a body whose ends are tightly connected to the cable ends and containing the connections between the optical fibers of the cables themselves and being characterized in that it comprises a metal plate, enclosed in said body, which is provided with a first element able to fasten the armor of the first cable and, around said first element, a plurality of elements able to fasten the components of the armor of the second cable and uniformly distributed at least along a line closed on itself. The plate has at least one through opening for the passage of the optical fibers of the second cable, said through opening being situated in a radially intermediate position between the element fastening the armor of the first cable to the plate and the elements fastening the individual components of the armor of the second cable to the plate and the connections between the optical fibers of the two cables being carried out between the end of the first cable and the metal plate.

Furthermore, in a joint forming the object of the invention, the body having its ends tightly connected to the ends of the cable sheaths is preferably constituted by a mass of polymeric material embedding, in addition to the cable ends, the metal plate, the end portions of the cables connected to the latter and the end portions of the optical fibers and their connections.

Other objects and advantages of the present invention will be apparent from the following detailed description of the presently preferred embodiments thereof, which description should be considered in conjunction with the accompanying drawings in which.

A joint according to the invention is able to connect any cable, in particular, a submarine cable, of the type in which the mechanically resistant armor occupies the radially innermost portion of the cable and has optical fibers therearound with any cable, in particular, a submarine cable, of the type in which the mechanically resistant armor surrounds the portion of the cable containing the optical fibers.

The essential element of a joint according to the invention is the presence of a metal plate having the following characteristics: The metal plate should have, preferably but not necessarily, at its own axis, an element to fasten to it the mechanically resistant armor of a cable of the type in which the armor has optical fibers therearound.

A further feature of the plate is that it should have, uniformly distributed along at least a line closed on itself, for example, a circle, preferably but not necessarily, coaxial to the plate axis, a plurality of elements for fastening the components, usually wires and/or metal straps, which form the mechanically resistant armor of a cable of the type in which the armor surrounds the optical fibers.

A still further feature of the metal plate is that it should have at least one through opening of any shape, situated in a radially intermediate position between the elements fastening the two armors to the plate, to allow the passage of the optical fibers of the cable in which the fibers are surrounded by the armor. Once the above indicated conditions are complied with, the plate may have any structure and configuration, provided that it is able to withstand the mechanical stresses imparted to it by the cable armors.

Figure 1:
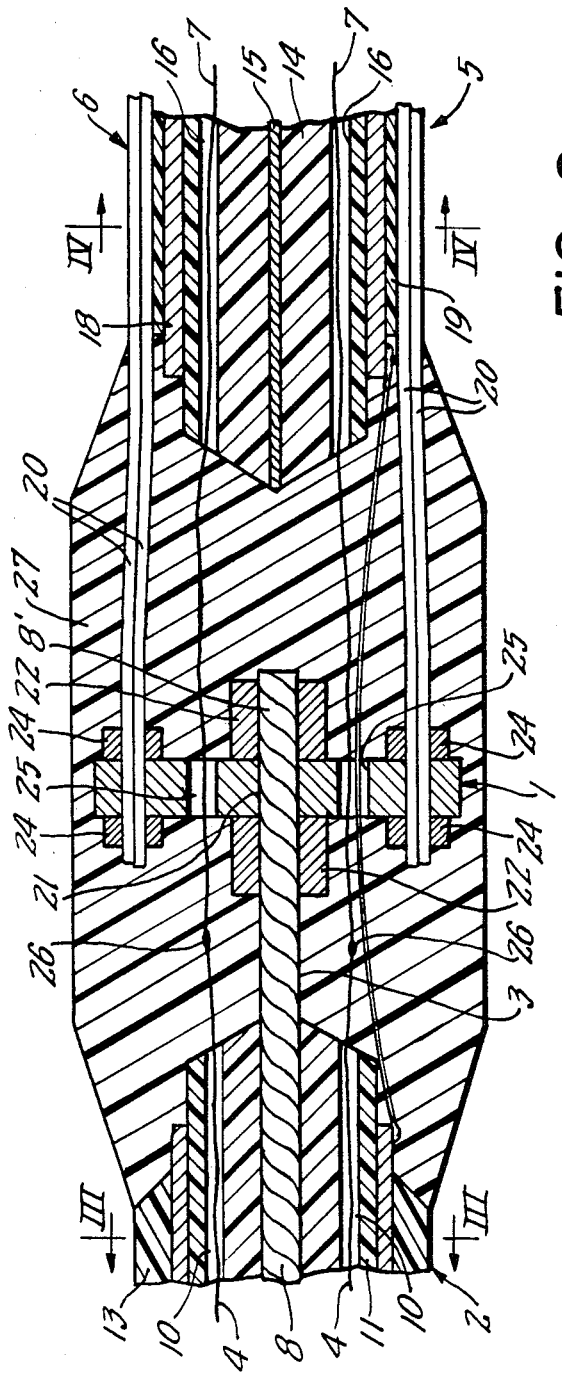
FIG. 1 is a longitudinal section of a joint according to the invention.

FIG. 1 illustrates one preferred embodiment of a joint in accordance with the invention. The joint incorporates a plate 1, described hereinafter, which fastens the armor 3, with optical fibers 4 within a cable 2, to the armor 6, surrounding the optical fibers 7 of a cable 5. Although in FIG. 1, the cables 2 and 5 have an equal diameter, this is not to be considered as restrictive since the cables may have different outer diameters.

Figure 3:
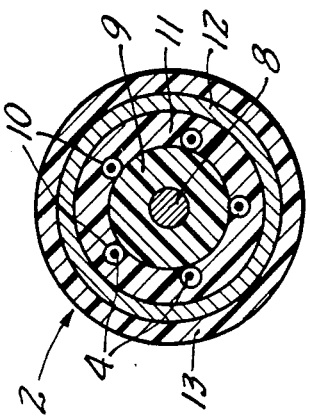
FIG. 3 is a cross section taken along line III—III of FIG. 1.

The cable 2 of the joint shown in FIG. 1, having the cross section shown in FIG. 3, has the following structure.

The radially innermost portion of the cable is occupied by a cord or rope 8 selected to withstand the mechanical stresses which are exerted on the cable during the cable laying or recovery.

The cord 8 is surrounded by a layer 9 of plastic material around which is wound up a plurality of small tubes 10 loosely containing the optical fibers 4.

A layer 11 of plastic material embeds said tubes 10 at its radially innermost surface and is surrounded by a sheath 12, preferably made of metal, constituting the cable sheath. If the sheath 12 is made of metal, it is covered by a layer 13 of plastic material.

Figure 4:
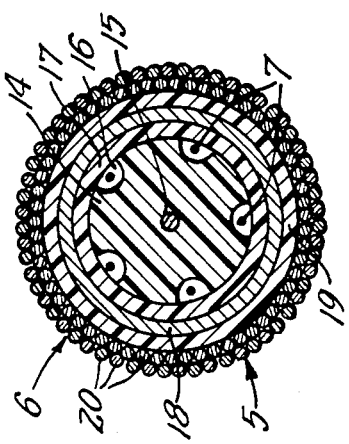
FIG. 4 is a cross section taken along line IV—IV of FIG. 1.

The particular cable 5 of the joint of FIG. 1, the cross-section of which is illustrated in FIG. 4, has, from the inside towards the outside, the following structure.

The radially innermost portion of the cable 5 has a core constituted by a structural shape 14 of circular section and made of plastic material which incorporates a reinforcing wire made, for example, of metallic material, glass fiber aromatic polyamides and the like.

The wire 15 is not a component of the armor of cable 5, but is merely an element intended to prevent elongations in the structural shape of the core 14 during its production and during the cable manufacture.

The outer surface of the core 14 has a plurality of grooves 16 having a helical path, for example, in the shape of a closed or an open helix, in which the optical fibers 7 are loosely received. A layer 17 of plastic material which closes said grooves 16 is around the core 14. Around the core 14, there is a sealing metal sheath 18 and any space within the sheath not occupied by other material preferably is filled by a substantially incompressible fluid, such as, for example, a silicone grease, a petroleum jelly or the like.

A mechanically resistant armor 6, formed by a plurality of metal wires 20, is arranged outside a covering 19, made of plastic material, for the metal sheath 18.

The joint of FIG. 1 shows the end portions of the optical fibers 4 and 7 and the end portions of the armors 3 and 6 respectively projecting from the ends of cables 2 and 5.

Figure 2:
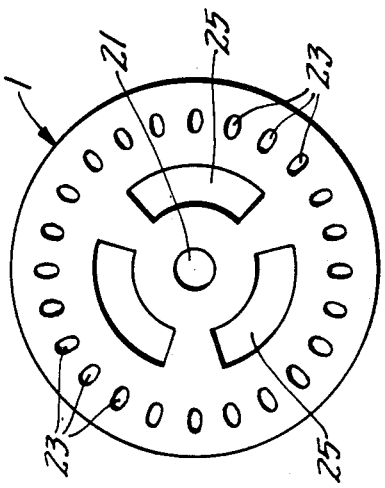
FIG. 2 is an end view of the plate forming part of the point shown in FIG. 1.

As said above, the armors 3 and 6 are fastened to the metal plate 1, which is illustrated in end view in FIG. 2.

As can be seen from FIGS. 1 and 2, said metal plate 1 is constituted by a disc having, at its axis, a through opening 21 through which the end portion of cord 8 forming the armor 3 of cable 2 passes.

On the end portion 8' of rope or cord 8, there is clamped a pair of metal clamps 22 having diametrical dimensions which are greater than those of the hole 21 in the plate 1 which provide the connection of said core 8 to the plate itself. However, this type of connection between the cord 8 and the plate 1 must not be considered as restrictive, since, for the purposes of the present invention, any fastening means or element can be used to connect the cord 8 or its component wires to the plate 1. A plurality of slots 23, into which the wires 20 forming the mechanically resistant armor of cable 5 are inserted in pairs, is provided along the outer portion of the disc or plate 1 in uniformly spaced relationship and on a line closed on itself, e.g., a circle.

The pairs of wires 20 are secured to one another and to the plate 1 by means of pairs of clamps 24 intended to ensure the connection of the components of the mechanically resistant armor 6 of cable 5 to the plate 1.

Also, the described connecting means must not be regarded as restrictive, because, for the purposes of the present invention, any means or element able to secure the wires 20 to the plate 1 can be employed.

According to an alternative embodiment not illustrated, in the plate 1 the slots 23 are distributed along two coaxial circles and each of said slots contain an individual wire forming the armor of cable 5 which is secured to the plate, for instance, by pairs of clamps identical to the pairs of clamps 24.

Through openings 25 are provided in a radially intermediate position between the hole 21 and the slots 23 in the disc body to allow only the optical fibers of cable 5, where the armor surrounds them, to pass through the disc 1 and to be connected at 26 to the optical fibers of the cable 2.

Preferably, but not necessarily, small tubes, not shown in FIG. 1, passing through the openings 25, contain in a loose way the ends of the optical fibers of the cables and their connections.

In terms of the present invention, the through openings 25 may have any shape. By way of example, in FIG. 2, said openings 25 have the form of curved slots.

Furthermore, when the sheaths 12 and 18 of cables 2 and 5 carry out the function of one of the electric conductors for the supply of energy to optoelectronic repeaters of the transmitted signals, a strip or bar 52, made, for instance, of copper, has its ends connected by welding to the sheaths and passes through one of holes 25 of plate 1.

In the joint shown in FIG. 1, the plate or disc 1, the end portion of the cord 8 outcoming from the cable 2 anchored to the plate, the end portions of the wires 20 of the armor 6 of cable 5 also anchored to the plate 1, the end portions of the optical fibers 4 and 7 with their connections which may be encased in small tubes, the strip 52 and the ends of cables 2 and 5 are embedded in a body 27 of substantially incompressible polymeric material, such as, for example, an epoxy resin, polyethylene or the like, which acts as a closing plug for the cables and forms the joint casing.

Figure 5:
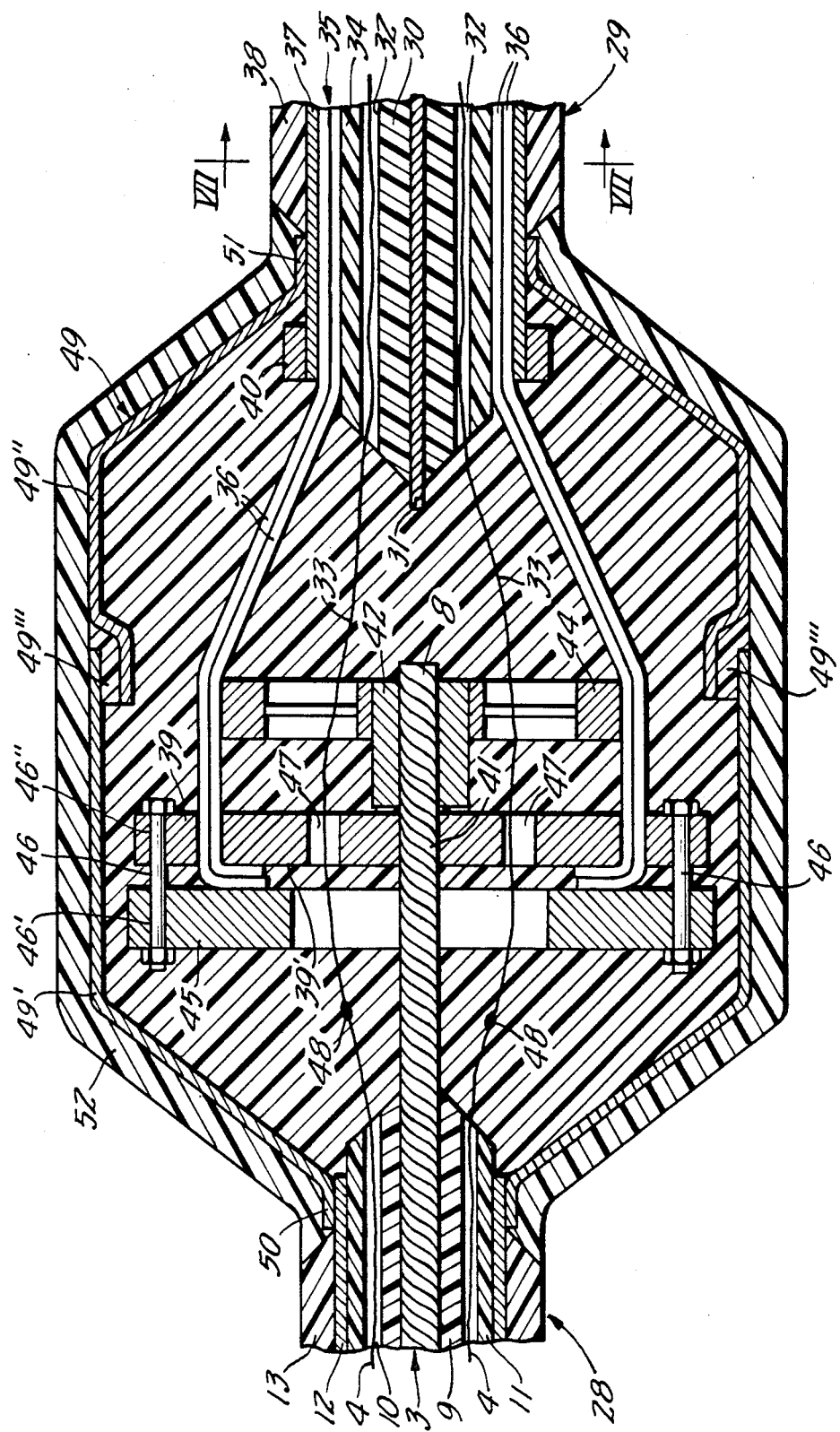
FIG. 5 is a longitudinal section of an alternative embodiment of the joint according to the invention.

FIG. 5 represents an alternative embodiment of a joint according to the invention which connects together a submarine cable 28 comprising optical fibers and of the type in which the mechanically resistant armor occupies the radially innermost portion of the cable and has optical fibers therearond and a submarine cable 29 comprising optical fibers and of the type in which the mechanically resistant armor is radially outward of and surrounds the optical fibers. As can be seen in FIG. 5, the two cables 28 and 29 have different diametrical dimensions. In particular, cable 28 has a structure identical to that of cable 2, the cross-section of which is shown in FIG. 3.

Figure 7:
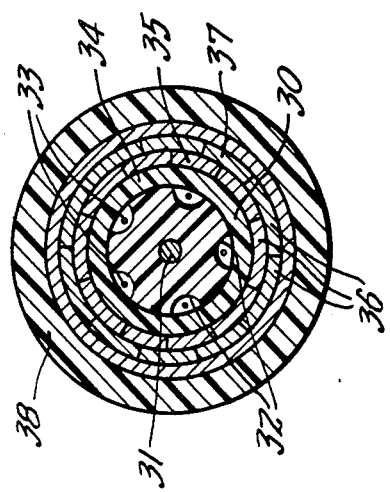
FIG. 7 is a cross-section taken along line VII—VII of FIG. 5.

The cable 29, the cross-section of which is shown in FIG. 7 has, from the inside towards the outside, the following structure.

The radially innermost portion of cable 29 is occupied by a core constituted by a structural shape of circular section, made of plastic material, which incorporates a wire 31, made, for instance, of metal or of glass fiber or of an aromatic polyamide, said wire being not a component of the armor of cable 29 and having the function only of preventing any elongation of the core during its production and during the cable manufacture. The outer surface of the core 30 has a plurality of grooves 32, having a helical path, for instance, in the shape of a closed or an open helix, and loosely containing the optical fibers 33.

A layer 34 of plastic material surrounds the core 30, closing the grooves 33. Around said layer 34, there is the cable armor 35, which is formed by a plurality of metal straps 36 helically wound up on said core 30.

A metal sheath 37, which acts as the sealing sheath of the cable, is arranged around the plurality of straps 36, and it is externally covered by a layer 38 of plastic material. Preferably, inside the cable sheath 37, any space free from other material is filled with a substantially incompressible fluid, such as a silicone grease, a petroleum jelly or the like.

The joint of FIG. 5 shows the respective armors 8 and 35 and the respective optical fibers 4 and 33 projecting from the ends of the cables 28 and 29.

Also, the joint shown in FIG. 5 comprises a metal plate 39 to which are associated connecting means, described hereinafter, for the two cable armors and in which there are through openings for the passage of optical fibers 33 belonging to cable 29 which is of the type where the armor 35 surrounds the optical fibers 33.

A binding element 40, such as, for instance, a sleeve, is provided around the armor 35 and at its end which is in the joint. The sleeve 40 connects together the straps 36 forming the armor 35, avoiding any modification of the latter and imparting a correct position to the end portions of straps 36 projecting from the cable end.

Figure 6:
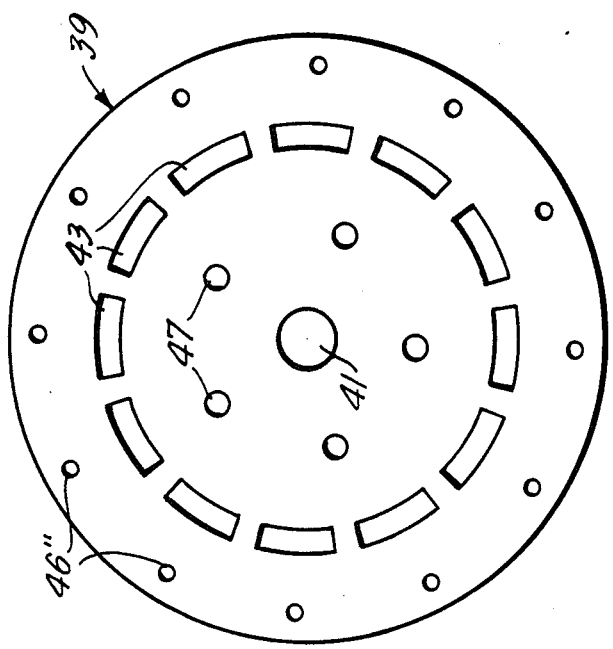
FIG. 6 is an end view of the plate forming part of the joint shown in FIG. 5.

As stated, the joint shown in FIG. 5 comprises a plate 39, shown in end view of FIG. 6, to which are associated elements to fasten to it the mechanically resistant armors of the two cables 28 and 29.

The metal plate 39 is constituted by a disc having, at its own axis, a through hole 41 through which the end portion of the cord 8 forming the mechanically resistant armor of the cable 28 passes. A metal clamp 42 or the like is clamped on the end of the cord 8. Said metal clamp 42, the diametrical dimensions of which are greater than those of the hole 41 of plate 39, secures the cord 8 to the plate 1, preventing its removal. Of course, other fastening means may be used to secure the cord 8 to the plate 39.

Furthermore, the plate 39 has a plurality of slots 43, uniformly distributed along a circular line coaxial to the plate axis and into which pairs of the straps 36 forming the mechanically resistant armor 35 of cable 29 are inserted. An annular spacer 44, applied on the clamp 42, supports the plurality of straps 36 inside the joint.

The end portions of the straps 36 are folded against the face 39' of the plate 39 which faces the end of the cable 28.

A ring 45, situated in front of the face 39' of the plate 39, is fastened to the latter by bolts 46 or the like, inserted into the holes 46' and 46" at the outer portions thereof, and presses the folded ends of the straps 36 against the plate 39, securing them to the latter.

In the joint illustrated in FIG. 5, the ring 45 is merely illustrative of an embodiment of means to secure the components of the mechanically resistant armor of cable 29 to the plate 39.

Moreover, the plate 39 has a plurality of through openings 47, which may, for instance, be circular holes, situated in an intermediate position between the hole 41 and the plurality of slots 43.

The end portions of the optical fibers 33 of cable 29 pass through the openings 47.

Connections 48 connect the ends of the optical fibers 33 of the cable 29 with the ends of the optical fibers 4 of the cable 28. Said connections are positioned in the space existing between the plate 39 and the end of cable 28.

A box-shaped casing 49 of metallic material (or, if desired, of plastic material) has its ends 50 and 51 tightly secured, for instance, by welding, to the metal sheaths 12 and 37 belonging respectively to cables 28 and 29, and encloses all the above described components of the joint.

Preferably, the metal casing 49 is externally covered with a layer 52 of plastic material connected to the ends of the layers 13 and 38 of plastic material of cables 28 and 29, respectively.

The space defined by the box-like casing 49 which, even if it is metallic, has little resistance to the hydrostatic pressure and is completely filled with a polymeric material, such as a casting plastic material, for instance, an epoxy resin, which embeds all the elements of the joint and acts as a closing plug for the ends of both cables.

If any space free from other material is present inside cables 28 and 29, such space is filled with silicone grease, petroleum jelly and in general with a polymeric material in the form of a viscous fluid having incompressibility characteristics. Also, the space inside the box-like casing 49 can be alternatively filled with the same viscous fluid which fills any space free from other material inside the cables.

As stated, in the joint of FIG. 5, the box-like casing 49 can be made of metal. As illustrated in FIG. 5, the casing 49 is formed by two parts 49' and 49" tightly connected together with the interposition of a body 49''' of electrically insulating material.

The particular structure of the metal casing 49, consisting of two electrically separate parts, has only the purpose of allowing the electric connection between the mechanically resistant armors of the two cables (when they also act as electrical conductors) by means of the joint plate 39 in order to provide one of the two conductors of the feeding circuit for optoelectronic repeaters of the transmitted signals, the other conductor being the sea.

According to an alternative embodiment, not illustrated, the metal casing 49 is devoid of discontinuity and a layer of insulating material is placed between the clamp 42 and the plate 39 and also covers the inner surface of hole 41 when the element of the two cables acting as a conductor of the feeding circuit for optoelectronic repeaters is constituted by the metal sheaths, the other conductor being the sea.

In general, as the two types of cables which may be connected by the joint according to the invention may have a different structure, and also as the elements acting in said cables as electric conductors may be different, many alternative methods may be followed by a technician skilled in this field to obtain by virtue of the joint an electric connection between the cables themselves.

From the description of the particular embodiments of joints according to the invention and from the following considerations, it is evident that the invention achieves the proposed goals.

First of all, the use in the joint of a metal plate, interposed between the cable ends, to which the cable armors are fastened, permits the obtaining of a mechanical continuity between said armors even though they are mutually offset with respect to the joint axis. Furthermore, the provision of openings in the plate to allow the passage of the end portions of the optical fibers of the cable in which the armor surrounds the optical fibers facilitates the connection of said fibers to the optical fibers of the other cable since said operation is carried out in a position where no obstacles are present which has the advantage of reliability of the connections and of the joint.

Furthermore, the reliability of the joint is also ensured by the fact that the optical fibers, in the passage thereof through the plate openings, follow a substantially rectilinear path and consequently cannot be subjected to bending stresses which, as known, may damage them and may have a negative influence on the joint performance.

Finally, the presence of a body of polymeric material, which incorporates the joint elements and the cable ends and acts as a plug for both cables, confers to the joint a high versatility. In particular, the presence of said plug, which blocks the ends of the two cables, permits, for instance, the connection of a cable of the type comprising a mechanically resistant armor radially inward of the portion thereof occupied by the optical fibers and in which the resistance to the hydrostatic pressure is obtained by filling any space free from other material with an incompressible fluid, to a cable provided with a mechanically resistant armor surrounding the optical fibers and having the purpose of withstanding the hydrostatic pressure.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A joint between a first telecommunication cable comprising optical fibers and a second telecommunication cable comprising optical fibers, said first cable having a centrally disposed mechanically resistant armor for withstanding the tension and compression stresses to which said first cable is subjected during use and handling and a plurality of optical fibers disposed around said armor and said second cable having a plurality of optical fibers surrounded by a mechanically resistant armor for withstanding the tension and compression stresses to which said second cable is subjected during use and handling, said joint comprising:

- a metal plate having a plurality of openings therethrough, including a first opening, a plurality of spaced second openings disposed around and spaced from said first opening and a plurality of spaced third openings disposed around and spaced from said second openings and said plate being intermediate the ends of said first cable and said second cable;
- first securing means securing said armor of said first cable in said first openings;
- second securing means securing said armor of said second cable in said third openings;
- connecting means interconnecting the optical fibers of said first cable respectively with optical fibers of said second cable, the optical fibers of at least one said first cable and said second cable extending through said second openings; and
- a protective body extending from said first cable to said second cable and enclosing said plate, said first and second securing means, said connecting means and the portions of the armors and said optical fibers intermediate the ends of said first cable and said second cable.

2. A joint as set forth in claim 1 wherein said connecting means are intermediate said plate and the end of said first cable.

3. A joint as set forth in claim 1 wherein said protective body comprises a mass of polymeric material connected to the end of said first cable and to the end of said second cable and in which said plate, said first and second securing means, said connecting means and said portions of said armors and said optical fibers are embedded.

4. A joint as set forth in claim 1 wherein said protective body is a casing connected to the end of said first cable and to the end of said second cable, said casing having any otherwise empty spaces therein filled with a substantially incompressible material.

5. A joint as set forth in claim 1 wherein said armor of said first cable extends through said first opening and said first securing means comprises a clamp secured to the portion of the last-mentioned said armor which extends through said first opening.

6. A joint as set forth in claim 5 wherein said armor of said second cable extends through said third openings and said second securing means comprises a plurality of clamps secured to the portions of the last-mentioned said armor which extends through said third openings.

7. A joint as set forth in claim 1 wherein said armor of said second cable extends through said third openings and the portions of the last-mentioned said armor which extend through said third openings are folded over against a face of said plate and further comprising a ring engaging said portions and further securing means for securing said ring to said plate and thereby preventing removal of the last-mentioned said armor from said third openings.

8. A joint as set forth in claim 7 further comprising a sleeve engaging said armor of said second cable at the end of said second cable and a spacer intermediate said end of said second cable and said plate and supported by said plate, said spacer having a peripheral surface engaging the last-mentioned said armor intermediate said end of said second cable and said plate.

* * * * *